No. 660,763. Patented Oct. 30, 1900.
G. L. THOMPSON.
NUT CRACKER.
(Application filed Mar. 26, 1900.)
(No Model.)
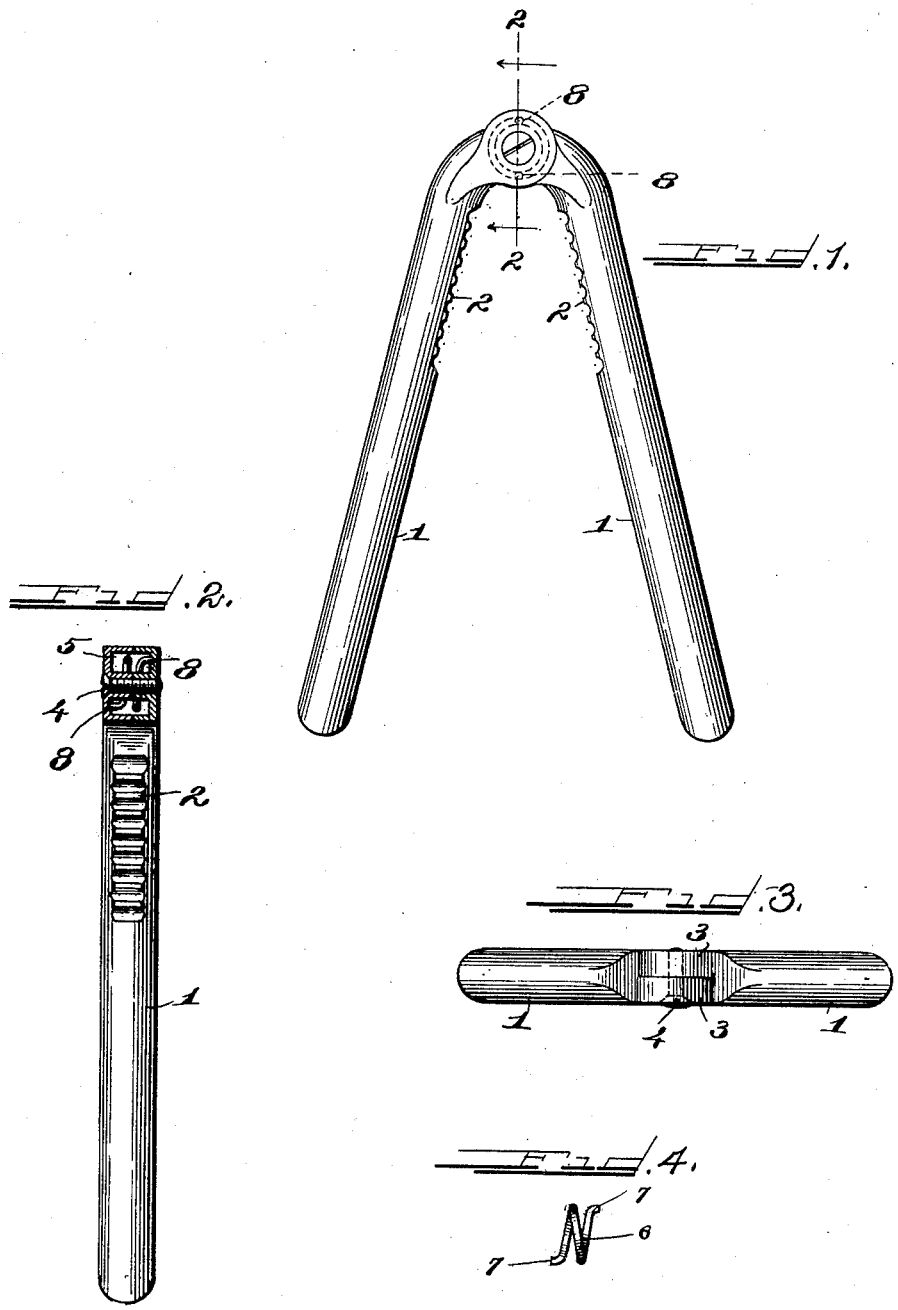
INVENTOR
Geo. L. Thompson

UNITED STATES PATENT OFFICE.

GEORGE L. THOMPSON, OF CHICAGO, ILLINOIS.

NUT-CRACKER.

SPECIFICATION forming part of Letters Patent No. 660,763, dated October 30, 1900.

Application filed March 26, 1900. Serial No. 10,156. (No model.)

*To all whom it may concern:*

Be it known that I, GEORGE L. THOMPSON, a citizen of the United States, residing at Chicago, in the county of Cook and State of Illinois, have invented Improvements in Nut-Crackers, of which the following is a specification.

This invention relates to improvements in nut-crackers, and has for its object to provide an improved construction in devices of this character.

The invention consists in the matters hereinafter set forth, and particularly pointed out in the appended claims, and will be fully understood from the following detailed description of the construction, illustrated in the accompanying drawings, in which—

Figure 1 shows an open nut-cracker constructed in accordance with my invention. Fig. 2 is a sectional view taken on line 2 2 of Fig. 1. Fig. 3 is a top plan view of the device. Fig. 4 is a detail of the opening spring.

In said drawings, 1 designates the handles, which are provided with jaw-surfaces 2 and which at their ends adjacent to said jaw-surfaces are bent inwardly past each other and provided with knuckles 3, that are joined by a rivet or screw 4, which thus pivotally connects the handles. Each of said knuckles is shown as cupped or turned out on its inner face, so that when placed together an intervening annular space 5 is left between them. A suitable spring 6 is then coiled within this annular space and has its extremities 7 turned outwardly to enter suitably-located holes 8 in the inner surfaces of said knuckles. The position of said holes 8 and the shaping of the springs 6 are made such that said spring normally tends to maintain the device open ready to receive the nut and yet with its handles spread not too much to enable it to be readily held in the open palm. The jaws may then be closed upon the nut by the closing of the hand, but will spring open again as soon as released, ready for a repetition of the operation.

It will be observed that the inner faces of the circular knuckles are so recessed that a central flange is formed around the central opening for the screw or rivet and an outer flange is formed around the edge of the knuckle, so that when the knuckles are secured together the central flanges come in contact and form a tube which surrounds the connecting-screw, and the outer flanges meet and form a housing which is entirely inclosed on all sides. The contacting edges of the inner and outer flanges form a broad bearing for the knuckle, thereby reducing wear to a minimum and preventing lateral vibration of the jaws when under strain. It will be further observed that thus forming the housing for the spring enables the spring to be secured in place by simply turning its ends outward substantially parallel with the connecting-screw and inserting them in holes in the respective outer walls of the knuckles. In this manner a construction is provided which is extremely strong and durable and which may be readily and cheaply manufactured. In assembling the parts it is simply necessary to first place the spring in one half of the housing and then place the other part of the housing upon the part containing the spring and insert the screw, care being taken to see that the respective ends of the spring enter the openings in the respective halves of the housing. It will be observed that a valuable feature lies in so constructing the knuckles that they form when the parts are assembled a housing completely closed on all sides and free of obstructions, whereby the implement may be readily kept clean and will not be dangerous in the hands of young children.

I claim as my invention—

1. A nut-cracker comprising a pair of levers each having formed on its upper end a cup-shaped knuckle, each knuckle having formed on its inner side a central inner annular flange and an outer continuous annular flange, a central pivot connecting these knuckles, this pivot extending through the tube formed by the two central flanges and serving to hold the central flanges in contact as well as the outer flanges, forming a broad unbroken bearing and a completely-closed housing, and a spring entirely inclosed in said housing and coiled around said central tubular flanges and having its respective ends connected to the respective parts of the housing, substantially as set forth.

2. A nut-cracker comprising a pair of levers each having formed on its upper end a cup-shaped knuckle, each knuckle having formed on its inner side an annular continuous flange or rim, a central pivot connecting said knuckles and holding said flanges in contact all around, thereby forming a broad, unbroken bearing and a completely closed housing, and a spring coiled around the pivot and entirely inclosed in said housing and having its respective ends engaged in openings in the respective outer walls of the housing, the ends of the spring being turned outward, substantially parallel with the pivot, for said purpose.

In testimony that I claim the foregoing as my invention I affix my signature, in presence of two subscribing witnesses, this 22d day of March, A. D. 1900.

GEO. L. THOMPSON.

Witnesses:
HENRY W. CARTER,
N. R. BAILEY.